(12) United States Patent
Suzuki

(10) Patent No.: US 9,131,064 B2
(45) Date of Patent: Sep. 8, 2015

(54) COMMUNICATION APPARATUS AND COMMUNICATION METHOD FOR INFORMATION PROCESSING APPARATUS

(75) Inventor: Takaaki Suzuki, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 783 days.

(21) Appl. No.: 13/270,317

(22) Filed: Oct. 11, 2011

(65) Prior Publication Data

US 2012/0092714 A1 Apr. 19, 2012

Related U.S. Application Data

(60) Provisional application No. 61/392,742, filed on Oct. 13, 2010.

(51) Int. Cl.
| | |
|---|---|
| G06F 3/12 | (2006.01) |
| H04M 1/725 | (2006.01) |
| H04W 48/18 | (2009.01) |
| H04W 52/02 | (2009.01) |
| H04W 92/10 | (2009.01) |

(52) U.S. Cl.
CPC ........... *H04M 1/7253* (2013.01); *G06F 3/1212* (2013.01); *G06F 3/1236* (2013.01); *G06F 3/1292* (2013.01); *H04W 48/18* (2013.01); *G06F 3/1221* (2013.01); *G06F 3/1226* (2013.01); *H04W 52/0261* (2013.01); *H04W 92/10* (2013.01); *Y02B 60/1271* (2013.01)

(58) Field of Classification Search
CPC . H04W 48/18; H04W 84/18; H04W 52/0261; H04W 52/146; H04W 52/246; H04W 92/10; G08B 25/10; G06F 3/1221; G06F 3/1236; G06F 3/1292; Y02B 60/1271
USPC .................................................. 358/1.15, 1.1
See application file for complete search history.

(56) References Cited

U.S. PATENT DOCUMENTS

2007/0254604 A1* 11/2007 Kim ................................ 455/88

FOREIGN PATENT DOCUMENTS

JP 2008-283356 11/2008

\* cited by examiner

*Primary Examiner* — Iriana Cruz
(74) *Attorney, Agent, or Firm* — Amin, Turocy & Watson, LLP

(57) ABSTRACT

A communication apparatus for an information processing apparatus includes: a data acquiring unit which acquires data; a determination unit which determines whether a volume of the data is greater than a reference value or not; a wireless communication method deciding unit which decides a wireless communication method, and which decides a wireless communication method to be used for data transmission, based on a communication speed of each method if the determination unit determines that the volume of the data is greater than the reference value, and decides a wireless communication method, based on power consumption if the volume of the data is determined as equal to or smaller than the reference value; and a wireless communication processing control unit which controls processing to transmit the data.

18 Claims, 9 Drawing Sheets

| REMAINING BATTERY CAPACITY OF TRANSMISSION DESTINATION APPARATUS | COMMUNICATION DATA VOLUME | COMMUNICATION METHOD DECISION MODE TO BE SELECTED |
|---|---|---|
| LARGE | 100 KBYTES OR LESS | POWER CONSUMPTION PRIORITIZING |
| | GREATER THAN 100 KBYTES | COMMUNICATION SPEED PRIORITIZING |
| MEDIUM | 500 KBYTES OR LESS | POWER CONSUMPTION PRIORITIZING |
| | GREATER THAN 500 KBYTES | COMMUNICATION SPEED PRIORITIZING |
| SMALL | 1 MBYTES OR LESS | POWER CONSUMPTION PRIORITIZING |
| | GREATER THAN 1 MBYTES | COMMUNICATION SPEED PRIORITIZING |

700

FIG.1
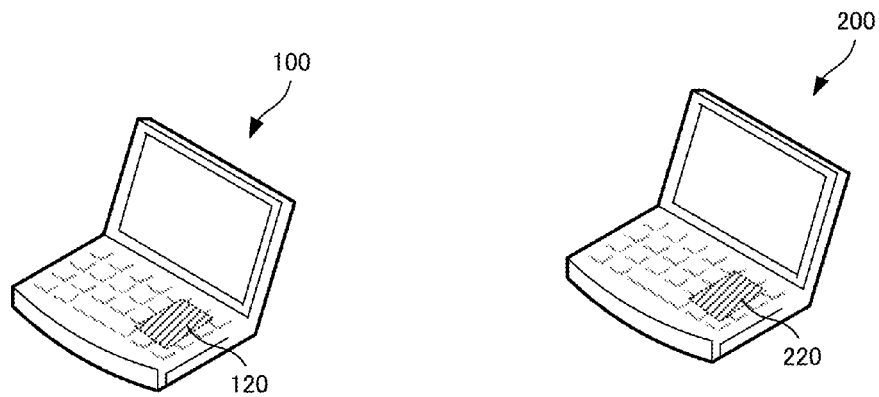
COMPUTER A : Wi-Fi802.11n, Bluetooth
COMPUTER B: Wi-Fi802.11n
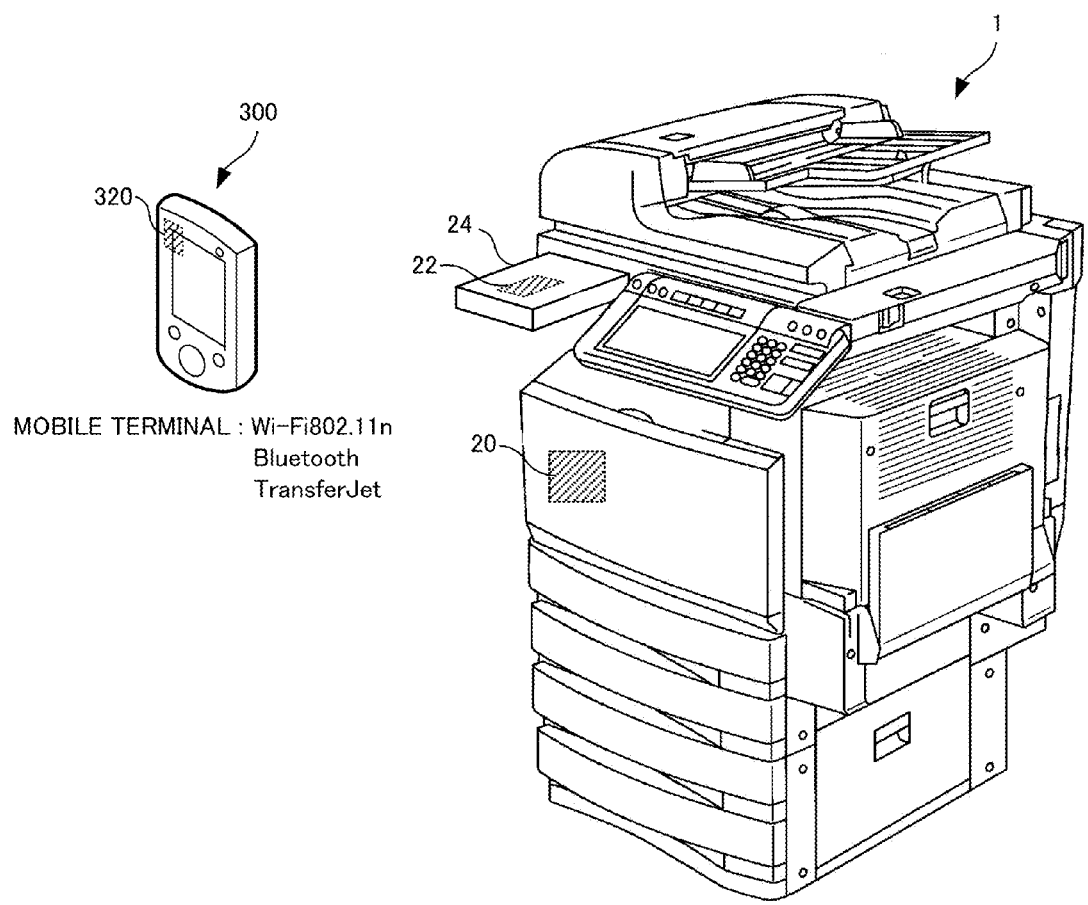
MOBILE TERMINAL : Wi-Fi802.11n Bluetooth TransferJet
IMAGE FORMING APPARATUS : Wi-Fi802.11n, Bluetooth TransferJet FIG.2
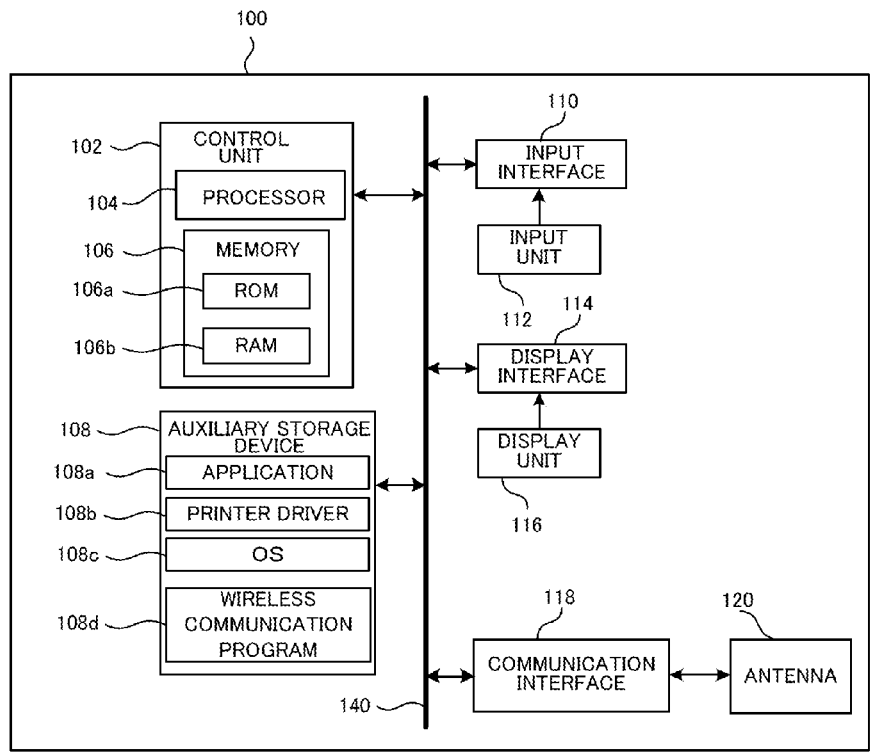
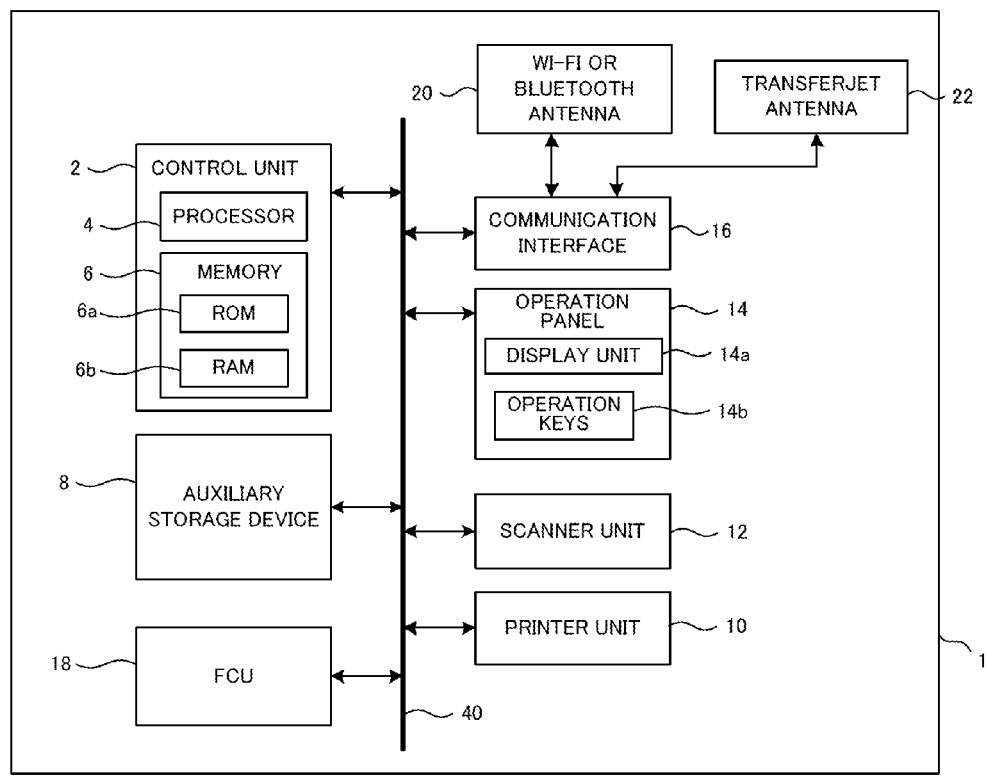

| COMMUNICATION DATA VOLUME | COMMUNICATION METHOD DECISION MODE TO BE SELECTED |
|---|---|
| 500 KBYTES OR LESS | POWER CONSUMPTION PRIORITIZING |
| GREATER THAN 500 KBYTES | COMMUNICATION SPEED PRIORITIZING |

| COMMUNICATION METHOD DECISION MODE | PRIORITY OF COMMUNICATION METHOD | | POWER CONSUMPTION | COMMUNICATION SPEED |
|---|---|---|---|---|
| POWER CONSUMPTION PRIORITIZING | ① | Bluetooth | SMALL | 1Mbps |
|  | ② | TransferJet | MEDIUM | 400Mbps |
|  | ③ | Wi-Fi 802.11n | LARGE | 100Mbps |
| COMMUNICATION SPEED PRIORITIZING | ① | TransferJet | MEDIUM | 400Mbps |
|  | ② | Wi-Fi 802.11n | LARGE | 100Mbps |
|  | ③ | Bluetooth | SMALL | 1Mbps |

FIG.9

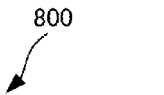

| OPERATION MODE OF IMAGE FORMING APPARATUS | COMMUNICATION DATA VOLUME | COMMUNICATION METHOD DECISION MODE TO BE SELECTED |
|---|---|---|
| NORMAL OPERATION | 500 KBYTES OR LESS | POWER CONSUMPTION PRIORITIZING |
| | GREATER THAN 500 KBYTES | COMMUNICATION SPEED PRIORITIZING |
| POWER-SAVING MODE | 1 MBYTES OR LESS | POWER CONSUMPTION PRIORITIZING |
| | GREATER THAN 1 MBYTES | COMMUNICATION SPEED PRIORITIZING |

COMMUNICATION APPARATUS AND COMMUNICATION METHOD FOR INFORMATION PROCESSING APPARATUS

CROSS-REFERENCE TO RELATED APPLICATIONS

This application is based upon and claims the benefit of priority from U.S. provisional application 61/392742, filed on Oct. 13, 2010; the entire contents of which are incorporated herein by reference.

FIELD

Embodiments described herein relate generally to a communication method between information processing apparatuses.

BACKGROUND

Conventionally, wireless communication is carried out to transmit and receive data between information processing apparatuses, such as between an image forming apparatus such as an MFP and a PC or between an image forming apparatus and a mobile terminal.

There are various standards for wireless communication. The standards for wireless communication include, for example, wireless LAN such as IEEE 802.11a, IEEE 802.11b, IEEE 802.11g and IEEE 802.11n, Bluetooth 1.x, 2.x, 3.x or 4.x, infrared rays, wireless USB, TransferJet (trademark registered), ZigBee, WiMax, Wireless HD and the like. These wireless communication standards have different conditions from each other, such as communication frequency, possible communication range, and communication speed.

Some of image forming apparatuses, PCs and mobile terminals support plural wireless communication standards of these wireless communication standards. When information processing apparatuses which support plural wireless communication standards carry out wireless communication with each other, a user needs to select one standard to be used from among the plural standards and operate the two devices to set the standard so that the two devices can establish communication with the same standard.

DESCRIPTION OF THE DRAWINGS

FIG. 1 shows a system configuration including an image forming apparatus and an apparatus which carries out communication with the image forming apparatus, according to an embodiment.

FIG. 2 is a block diagram showing the configuration of the image forming apparatus and a computer A according to the embodiment.

FIG. 9 shows a first data table for deciding a communication method decision mode according to an embodiment.

DETAILED DESCRIPTION

In general, according to one embodiment, a communication apparatus includes a data acquiring unit, a determination unit, a wireless communication method deciding unit, and a wireless communication processing control unit. The data acquiring unit acquires data to be transmitted. The determination unit determines whether a volume of the data acquired by the data acquiring unit is greater than a reference value or not. The wireless communication method deciding unit is a wireless communication method deciding unit which decides a wireless communication method by which the data is transmitted, from among plural wireless communication methods available for data transmission. When the determination unit determines that the volume of the data is greater than the reference value, the wireless communication method deciding unit decides a wireless communication method to be used for data transmission, based on a communication speed of each wireless communication method. When the volume of the data is determined as equal to or smaller than the reference value, the wireless communication method deciding unit decides a wireless communication method to be used for data transmission, based on power consumption at the time of wireless communication by each wireless communication method. The wireless communication processing control unit controls processing to transmit the data acquired by the data acquiring unit, using the wireless communication method decided by the wireless communication method deciding unit.

Hereinafter, embodiments will be described with reference to the drawings.

First Embodiment

Figure 3:
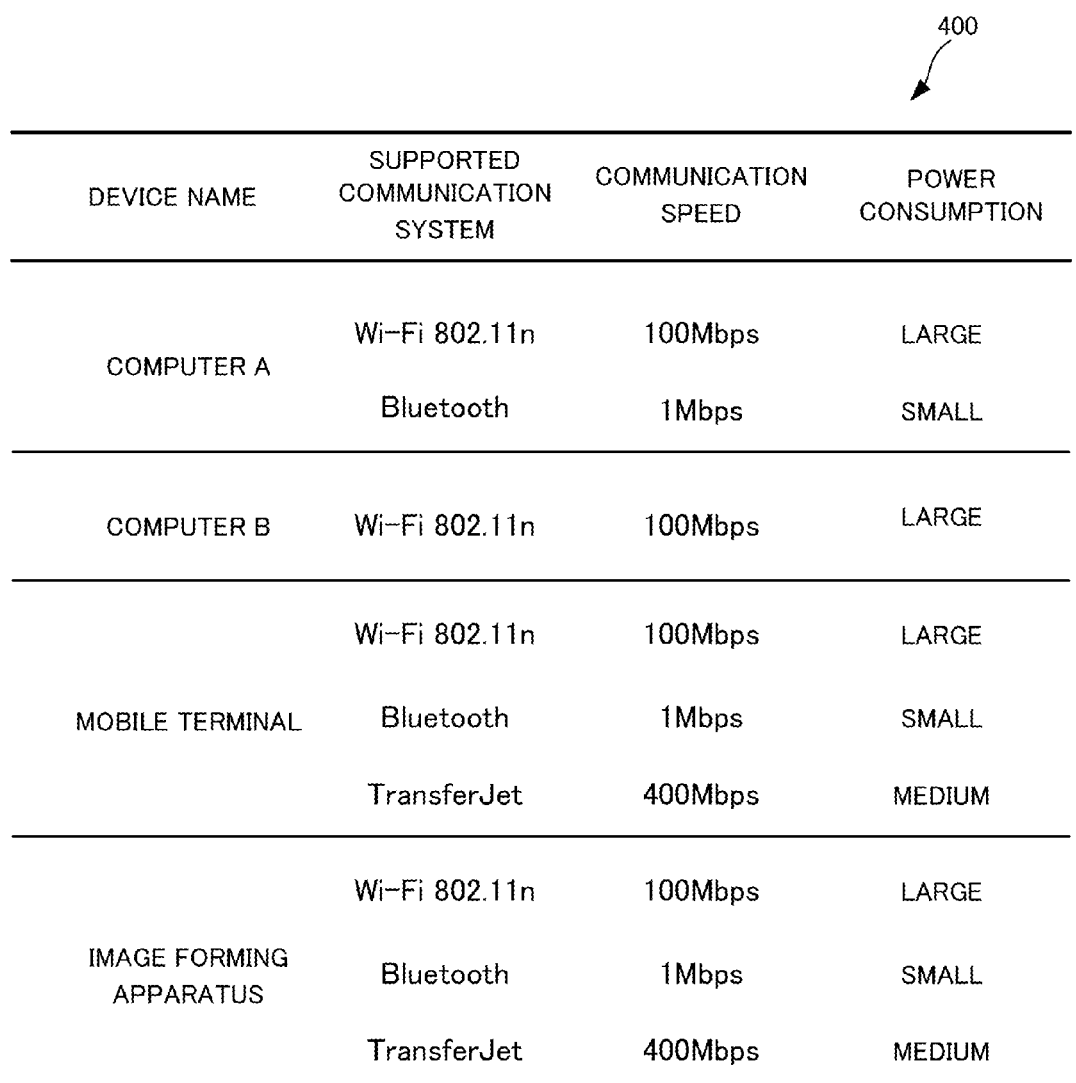
FIG. 3 is a table showing wireless communication methods supported by each device shown in FIG. 1, and communication speed and power consumption in each communication method.

FIG. 1 shows a system configuration including an image forming apparatus 1, and a computer A 100, a computer B 200 and a mobile terminal 300 which communicate with the image forming apparatus 1. FIG. 2 is a block diagram showing the configuration of the image forming apparatus 1 and the computer A 100 according to this embodiment. FIG. 3 is a table showing wireless communication methods supported by each device shown in FIG. 1, and communication speed and power consumption in each communication method. As shown in FIG. 1 and FIG. 3, the computer A 100 supports Wi-Fi 802.11n and Bluetooth. The computer B 200 supports Wi-Fi 802.11n. The mobile terminal 300 supports Wi-Fi 802.11n, Bluetooth, and TransferJet. The image forming apparatus 1 supports Wi-Fi 802.11n, Bluetooth, and TransferJet. Wi-Fi 802.11n refers to IEEE 802.11n wireless LAN.

The image forming apparatus 1 of this embodiment supports wireless communication standards such as Wi-Fi (trademark registered), Bluetooth (trademark registered) and TransferJet (trademark registered), as shown in FIG. 1. The image forming apparatus 1 can communicate data with the computers (computer A 100 and computer B 200) and the mobile terminal (mobile terminal 300) such as a mobile phone, and the like, using these wireless communication methods. For example, the image forming apparatus 1 can transmit image data read in the image forming apparatus 1 or data stored in a storage area to the computers or the like and receive data stored in the computers and the mobile terminal, using wireless communication. Hereinafter, the configuration of each device will be described.

The image forming apparatus 1 includes a control unit 2, an auxiliary storage device 8, a printer unit 10, a scanner unit 12, an operation panel 14, a communication interface (communication I/F) 16, a facsimile control unit (FCU) 18, a Wi-Fi or Bluetooth antenna 20 (hereinafter also referred to as "antenna 20"), and a TransferJet antenna 22. The respective components of the image forming apparatus 1 are connected via a bus 40.

The control unit 2 functions with a processor 4, a memory 6, and an operating system (OS).

The processor 4 is a CPU (central processing unit) or MPU (micro processing unit).

The memory 6 is, for example, a semiconductor memory. The memory 6 includes a ROM (read only memory) 6a to store a control program of the processor 4, and a RAM (random access memory) 6b to provide a temporary work area for the processor 4.

The control unit 2 controls the printer unit 10, the scanner unit 12, the operation panel 14, the communication interface 16, the FCU 18, the Wi-Fi or Bluetooth antenna 20, the TransferJet antenna 22 and the like, based on the control program or the like stored in the ROM 6a or the auxiliary storage device 8. The control unit 2 may further include various image processing functions. The control unit 2 may include an ASIC (application specific integrated circuit) to realize part or the whole of functions provided in the image forming apparatus 1.

The auxiliary storage device 8 stores application programs and the OS. The application programs include programs to execute functions provided in the image forming apparatus 1 such as a copy function, a print function, a scanner function, a facsimile function, a network file function, and a wireless communication function. The application programs further include an application for web client (web browser) and other applications.

The auxiliary storage device 8 can also store image data generated by the scanner unit 12 reading a document, data acquired from an external device by wired communication or wireless communication via the communication interface 16, and the like. The auxiliary storage device 8 can also temporarily store a print job outputted by a client terminal until the print is executed.

The auxiliary storage device 8 may be, for example, a magnetic storage device such as a hard disk drive, an optical storage device, a semiconductor storage device (flash memory or the like), or any combination of these storage devices. The auxiliary storage device 8 properly saves software updates, protected electronic documents, text data, account information, policy information and the like.

The printer unit 10 forms an image on a sheet, based on image data of a document read by the scanner unit 12 and a print job received from an external client terminal.

The scanner unit 12 includes a built-in scanning and reading unit which reads a document in the form of an image, a document placing table, and an automatic document feeder which carries a document to a reading position. The scanning and reading unit of the scanner unit 12 reads a document set on the document placing table or the automatic document feeder.

The operation panel 14 includes a touch panel-type display unit 14a and various operation keys 14b. The display unit 14a displays setting contents about processing conditions, for example, sheet size, the number of sheets of copy, print density setting, or finishing (stitching, folding) and the like. The operation keys 14b include, for example, ten keys, a reset key, a stop key, a start key and the like. By touching and operating the display unit 14a or operating the operation keys 14b, the user can designate execution of various kinds of processing such as print and can change the setting contents of processing conditions.

The communication interface 16 is an interface which connects the image forming apparatus 1 with an external device such as a client terminal via a network. In this embodiment, the communication interface 16 also functions as an interface to communicate wirelessly with the computer A 100, the computer B 200, the mobile terminal 300 and the like via the Wi-Fi or Bluetooth antenna 20 and the TransferJet antenna 22. The external device may be an external storage device such as a flash memory. The image forming apparatus 1 can also carry out so-called direct print in which image data is acquired from that external storage device and the acquired image is printed.

The communication interface 16 connects to an external device via proper wireless communication or wired communication conforming to IEEE 802.15, IEEE 802.11, IEEE 802.3, IEEE 1284, IrDA and the like, for example, Bluetooth, wireless LAN, infrared connection, and optical connection. The communication interface 16 includes a buffer and temporarily holds part or the whole of received data in the buffer.

The control unit 2 communicates with the computer A 100, the computer B 200, the mobile terminal 300 and other external devices via the communication interface 16 and the Wi-Fi or Bluetooth antenna 20 or the TransferJet antenna 22.

The facsimile control unit (FCU) 18 controls facsimile transmission and reception in the image forming apparatus 1.

The Wi-Fi or Bluetooth antenna 20 is an antenna used to carry out wireless communication by a Wi-Fi or Bluetooth wireless communication method. In this embodiment, this antenna is a common antenna shared by Wi-Fi and Bluetooth systems. However, separate antennas may be provided for the respective wireless communication methods.

The TransferJet antenna 22 is an antenna to communicate by the TransferJet system. The TransferJet antenna 22 is housed inside a pedestal 24 on which a TransferJet-supporting device is placed, as shown in FIG. 1. The TransferJet system allows a very short communication range of several centimeters. Therefore, as a device such as the mobile terminal 300 capable of communication by the TransferJet system is placed on the pedestal 24, wireless communication by the TransferJet system is enabled.

Next, the computer A 100 includes a control unit 102, an auxiliary storage device 108, an input interface (input I/F) 110, an input unit 112, a display interface (display I/F) 114, a display unit 116, a communication interface (communication I/F) 118, and an antenna 120. The respective components of the computer A 100 are connected via a bus 140.

The control unit 102 functions with a processor 104 made up of a CPU (central processing unit) or MPU (micro processing unit), a memory 106, and an operating system (OS) 108c stored in the auxiliary storage device 108.

The processor 104 executes an application 108a stored in the auxiliary storage device 108 and also executes a printer driver 108b, thus executing processing to generate a print job based on print target data. For example, when the computer A 100 and the image forming apparatus 1 are connected with each other via a network such as LAN, the processor 104 can execute processing to transmit the generated print job to the image forming apparatus 1 via the communication interface 118 and the network.

The processor 104 also executes a wireless communication program 108d for wireless communication and controls wireless communication processing. In the case of the computer A 100, the processor 104 controls Wi-Fi 802.11n and Bluetooth wireless communication processing supported by the computer A 100.

The memory 106 is, for example, a semiconductor memory, and includes a ROM (read only memory) 106a to store a control program of the processor 104 and a RAM (random access memory) 106b to provide a temporary work area for the processor 104.

The auxiliary storage device 108 stores the application program 108a, the printer driver 108b, the OS (operating system) 108c as the control program of the processor 104, and the wireless communication program 108d.

The application program 108a operates as software of the OS 108c. The application program 108a includes a web application in addition to general software such as document creation software.

The printer driver 108b is a device driver controlling the image forming apparatus 1 in accordance with a print instruction from the application program 108a, and operates as software of the OS 108c.

The wireless communication program 108d is a program for the computer A 100 to communicate wirelessly with another device by the Wi-Fi 802.11n or Bluetooth communication method. Separate programs may be provided for the Wi-Fi 802.11n and Bluetooth communication systems.

The auxiliary storage device 108 with the above functions may be, for example, a hard disk drive or another magnetic storage device, an optical storage device, a semiconductor storage device such as a flash memory, or any combination of these storage devices.

The input interface 110 is an interface to connect the input unit 112. The input unit 112 is an input device such as a keyboard device, a pointing device like a mouse, or a touch panel.

The display interface 114 is an interface to connect the display unit 116. The display interface 114 receives data to be displayed on the display unit 116 from other components connected to the bus 140. The display interface 114 outputs display data to the display unit 116. The display unit 116 displays the outputted display data. The display unit 116 is, for example, a display or touch panel.

The communication interface 118 is an interface to connect with an external device. In this embodiment, the communication interface 118 also functions as an interface to communicate wirelessly with other devices such as the image forming apparatus 1 via the antenna 120.

The communication interface 118 connects with an external device via proper wireless communication or wired communication conforming to IEEE 802.15, IEEE 802.11, IEEE 802.3, IEEE 1284, IrDA and the like, for example, Bluetooth, wireless LAN, infrared connection, and optical connection. The control unit 102 communicates with the image forming apparatus 1, the other computer B 200, the mobile terminal 300 and the like via the communication interface 118 and the antenna.

The antenna 120 transmits and receives radio waves at the time of wireless communication with other devices. Since the computer A 100 supports Wi-Fi 802.11n and Bluetooth, the computer A 100 may have separate antennas for the respective communication standards.

The foregoing is the configuration of the computer A 100.

The computer B 200 has an antenna 220. The mobile terminal 300 has an antenna 320. The other parts of the configuration of the computer B 200 and the mobile terminal 300 are similar to the configuration of the computer A 100 and therefore will not be described further in detail. However, the computer B 200 only supports Wi-Fi 802.11n, and the mobile terminal 300 supports Wi-Fi 802.11n, Bluetooth, and TransferJet. Therefore, the content of the wireless communication program 108d differs from each other. Since the mobile terminal 300 supports plural wireless communication methods, the mobile terminal 300 may have antennas corresponding to the respective wireless communication methods.

Figure 4:
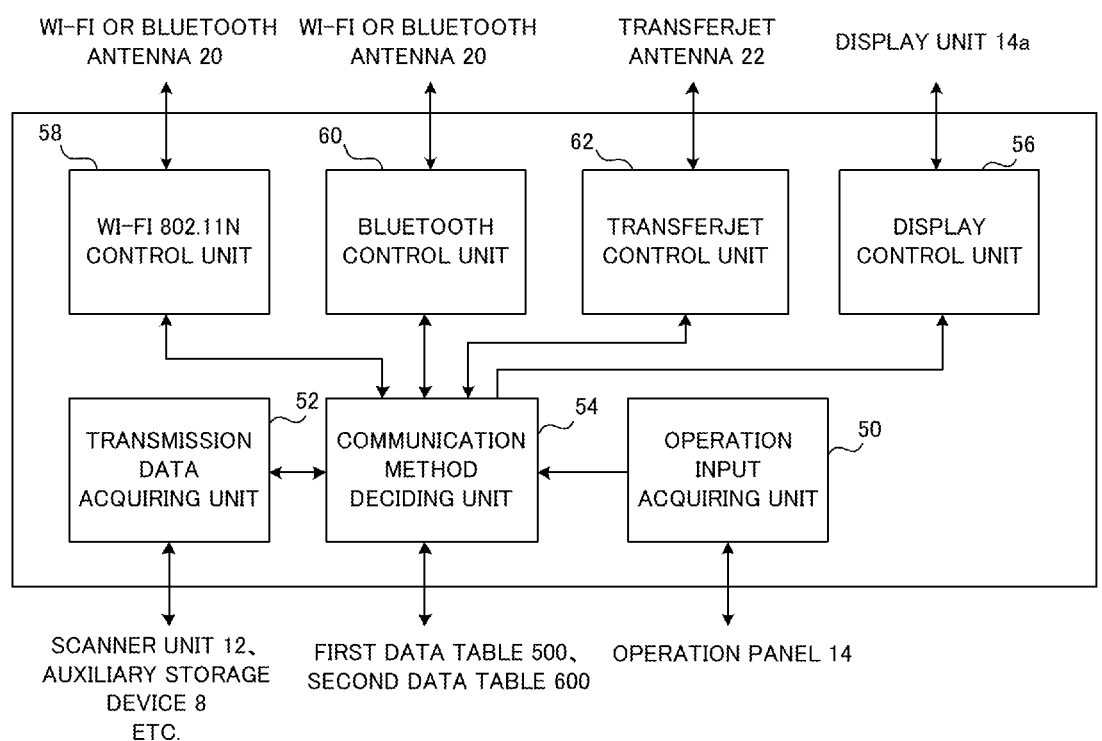
FIG. 4 is a functional block diagram showing functions of the image forming apparatus of the embodiment.

Next, wireless communication processing executed by the image forming apparatus 1 will be described. FIG. 4 is a functional block diagram showing functions of the image forming apparatus 1 of this embodiment. The image forming apparatus 1 includes an operation input acquiring unit 50, a transmission data acquiring unit 52, a communication method deciding unit 54 as a determination unit and a wireless communication method deciding unit, a display control unit 56, a Wi-Fi 802.11n control unit 58, a Bluetooth control unit 60, and a TransferJet control unit 62 as a wireless communication processing control unit.

The operation input acquiring unit 50 acquires an operation input from the operation panel 14. In this embodiment, for example, the operation input acquiring unit 50 acquires an operation input which designates execution of wireless communication processing to communicate wirelessly with an external device such as the computer A 100 or the mobile terminal 300.

The transmission data acquiring unit 52 acquires target data to be transmitted to an external device. For example, the transmission data acquiring unit 52 acquires from the scanner unit 12 image data of a document read by the scanner unit 12, based on an operation input from the user. Also, for example, based on an operation input to designate data stored in the auxiliary storage device 8 as transmission target data, the transmission data acquiring unit 52 can acquire the designated data from the auxiliary storage device 8.

The communication method deciding unit 54 decides a wireless communication method by which data is to be transmitted from among the wireless communication methods supported by the image forming apparatus 1, when the operation input acquiring unit 50 acquires an operation input designating execution of processing to transmit data by wireless communication.

The display control unit 56 controls display on the screen of the display unit 14a. In this embodiment, the display control unit 56 can display a list of devices capable of wireless communication with the image forming apparatus 1 at the time of establishing wireless communication between the image forming apparatus 1 and an external device. The user can operate the operation panel 14 to select, from the list, a target device (for example, the computer A 100) for data transmission from the image forming apparatus 1. Information about which device is capable of wireless communication is acquired by processing in which the Wi-Fi 802.11n control unit 58, the Bluetooth control unit 60 and the TransferJet control unit 62 search for a device capable of communication, which will be described later.

The Wi-Fi 802.11n control unit 58 controls processing of Wi-Fi 802.11n wireless communication. Before carrying out data transmission processing by wireless communication, the Wi-Fi 802.11n control unit 58 first carries out search to find out whether there is a device with which wireless communication can be established by Wi-Fi 802.11n. Specifically, the Wi-Fi 802.11n control unit 58 outputs a signal to confirm whether wireless communication by Wi-Fi 802.11n is possible, via the Wi-Fi or Bluetooth antenna 20. When a signal indicating that wireless communication is possible is returned in response to that signal, the Wi-Fi 802.11n control unit 58 can confirm that wireless communication is possible with a device that outputs the response signal. When carrying out wireless communication, the external device can transmit an identification number unique to the external device. Based on the transmitted identification number, the image forming apparatus 1 can identify which device is capable of Wi-Fi 802.11n wireless communication.

In the case of data communication by Wi-Fi 802.11n, the Wi-Fi 802.11n control unit 58 also controls processing to transmit data to a transmission counterpart device via the Wi-Fi or Bluetooth antenna 20.

The Bluetooth control unit 60 controls processing at the time of wireless communication by the Bluetooth wireless communication method. First, the Bluetooth control unit 60 carries out search to find out whether there is a device in the surroundings with which wireless communication can be established by Bluetooth. The search method is similar to the method used by the Wi-Fi 802.11n control unit 58. Then, in the case of carry out data communication by Bluetooth, the Bluetooth control unit 60 controls processing to transmit data to the transmission counterpart device via the Wi-Fi or Bluetooth antenna 20.

The TransferJet control unit 62 controls processing at the time of wireless communication by the TransferJet wireless communication method. The TransferJet control unit 62 carries out search to find out whether there is a device in the surroundings with which wireless communication can be established by TransferJet, similarly to the Wi-Fi 802.11n control unit 58 or the like. In the case of carrying out data communication by TransferJet, the TransferJet control unit 62 controls processing to transmit data to the transmission counterpart device via the TransferJet communication antenna 22.

Figure 5:
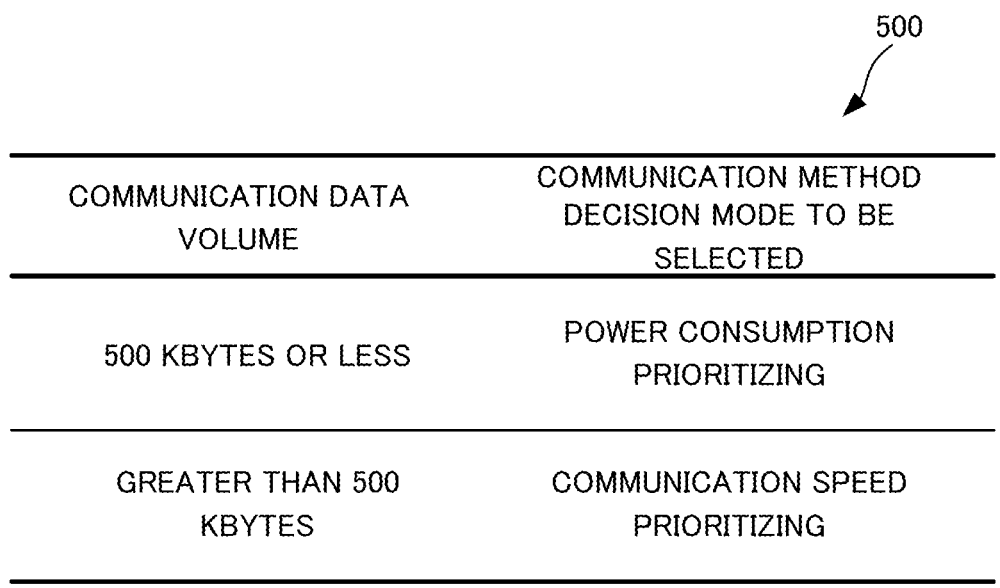
FIG. 5 shows a first data table showing the relation between data volume of data to be transmitted via wireless communication from the image forming apparatus to an external device and communication method decision modes.
Figure 6:
FIG. 6 shows a second data table showing the relation between each communication method decision mode and priority of communication methods.

Here, a method for deciding an optimum wireless communication method from among plural wireless communication methods according to the embodiment will be described specifically with reference to FIG. 5 and FIG. 6. FIG. 5 shows a first data table 500 showing the relation between the data volume of data to be transmitted by wireless communication from the image forming apparatus 1 to an external device and communication method decision modes. FIG. 6 shows a second data table 600 showing the relation between each communication method decision mode and priority of communication methods. A "communication method decision mode" refers to which condition, of communication conditions such as the amount of power consumption and communication speed that differ depending on the wireless communication method, should be emphasized in deciding a wireless communication method used for data transmission, based on conditions such as the data volume to be communicated wirelessly.

As shown in the first data table 500 of FIG. 5, in this embodiment, there are two communication method decision modes, that is, power consumption prioritizing mode and communication speed prioritizing mode. The first data table 500 shows correspondence such that the power consumption prioritizing mode is selected when the volume of transmitted data is 500 kBytes or smaller, and the communication speed prioritizing mode is selected when the data volume is greater than 500 kBytes.

In the second data table 600 shown in FIG. 6, priority in selecting a wireless communication method is set so that a wireless communication method with less power consumption is employed as a wireless communication method for transmitting data in the case of the power consumption prioritizing mode. Specifically, of the wireless communication methods supported by the image forming apparatus 1, Bluetooth, which has the least power consumption, is given top priority, and then TransferJet and Wi-Fi 802.11n are prioritized next.

Meanwhile, when the communication speed prioritizing mode is selected, priority is set so that a wireless communication method with a higher communication speed is employed. Specifically, TransferJet, which has the highest communication speed, is given top priority, and then Wi-Fi 802.11n and Bluetooth are prioritized next.

Processing to decide a wireless communication method will be described with reference to the first data table 500 and the second data table 600. When an instruction to execute processing to transmit data by wireless communication to an external device is given, the communication method deciding unit 54 selects one of the above communication method decision modes, based on the first data table 500 shown in FIG. 5 and the volume of data to be transmitted. For example, when the data volume is 400 kBytes, the communication method deciding unit 54 selects the power consumption prioritizing mode, based on the first data table 500.

Then, the communication method deciding unit 54 decides a wireless communication method to be used for data transmission, based on the second data table shown in FIG. 6, the communication method decision mode selected according to the first data table 500, and information indicating which wireless communication method is supported by the transmission counterpart to which data is to be transmitted. For example, where the power consumption prioritizing mode is selected according to the first data table 500 and the data transmission destination is the computer A 100, the computer A 100 supports Wi-Fi 802.11n and Bluetooth. Therefore, the communication method deciding unit 54 employs Bluetooth, which is prioritized over Wi-Fi 802.11n, as the wireless communication method in the case of the power consumption prioritizing mode, based on the second data table 600.

The information about which wireless communication method is supported by the device of the data transmission destination can be acquired by the processing in which the Wi-Fi 802.11n control unit 58, the Bluetooth control unit 60 and the TransferJet control unit 62 search whether there is a device which supports each wireless communication method, as described above.

When deciding a wireless communication method based on the second data table 600, if there is a wireless communication method that is not supported by the device of data transmission destination, the communication method deciding unit 54 employs a wireless communication method with the highest priority of the methods except the unsupported wireless communication method.

With the above functions of the image forming apparatus 1 according to the embodiment, when the volume of transmission target data is greater than a predetermined reference value, transmission of the data is likely to take time and therefore a wireless communication method with a higher communication speed tends to be used for data communication. Meanwhile, when the volume of data is smaller than the predetermined reference value, transmission of the data is likely to take less time even without high communication speeds. Therefore, a wireless communication method with smaller power consumption tends to be used for data communication and power consumption can be reduced.

Figure 7:
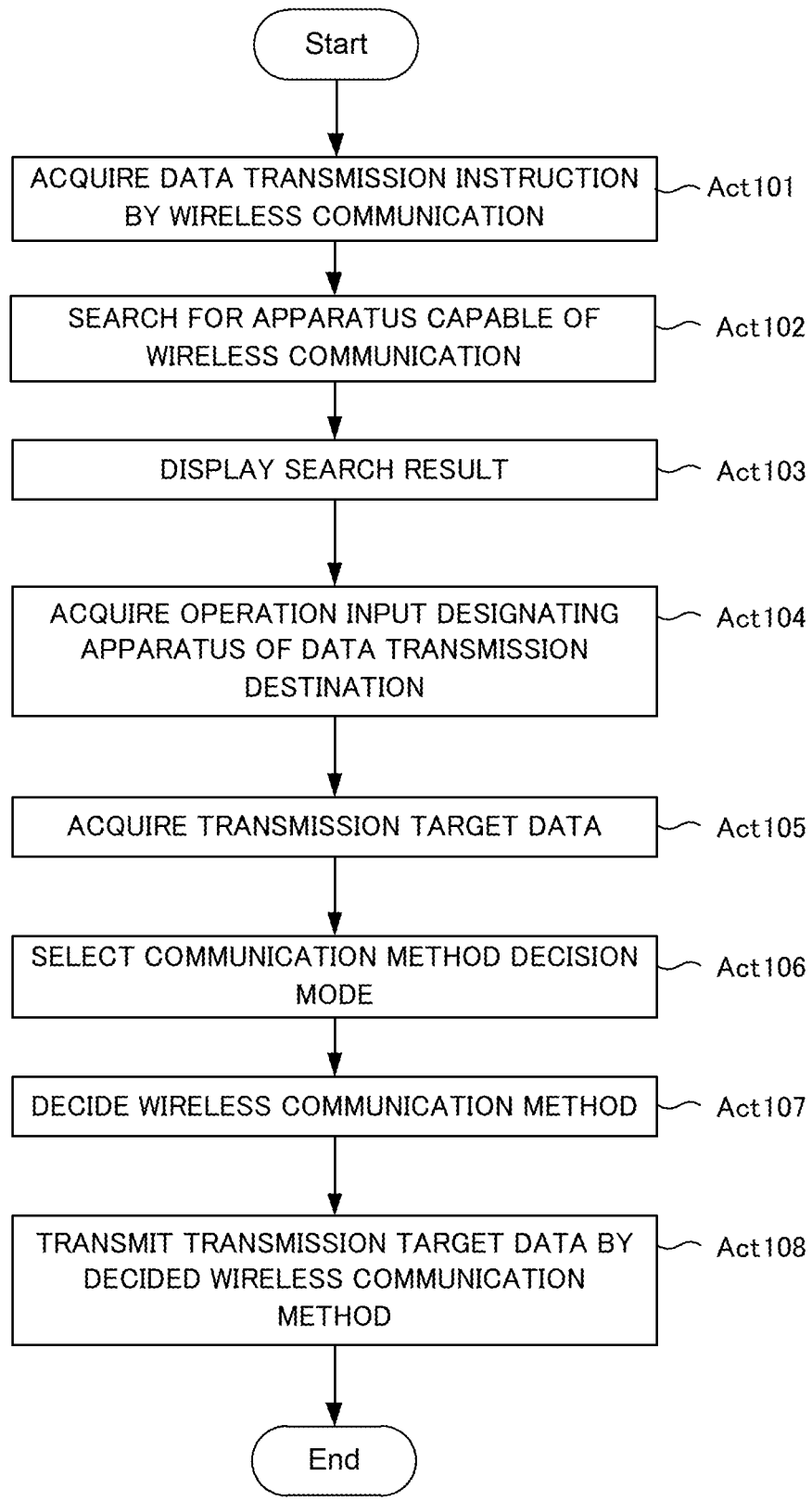
FIG. 7 is a flowchart showing the flow of a wireless communication processing method.

Next, the flow of the wireless communication processing method executed by the image forming apparatus 1 of this embodiment will be described. FIG. 7 is a flowchart showing the flow of the wireless communication processing method.

First, the operation input acquiring unit 50 acquires an operation input for carrying processing to transmit data by wireless communication from the image forming apparatus 1 to an external device (ACT 101).

Next, the communication method deciding unit 54 causes the Wi-Fi 802.11n control unit 58, the Bluetooth control unit 60 and the TransferJet control unit 62 to execute processing to search whether there is a device which supports each wireless communication method within a possible communication range (ACT 102).

The display control unit 56 displays the result of the search in ACT 102 on the display unit 14a (ACT 103). The display control unit 56 displays a device found out as capable of wireless communication in the search by at least of the control units (that is, a device capable of wireless communication with the image forming apparatus 1 by one of the wireless communication methods), as a device capable of wireless communication.

Next, the operation input acquiring unit 50 acquires an operation input to designate a device from among the devices capable of wireless communication displayed on the display unit 14a, as a transmission destination device to which the user transmits data (ACT 104).

Next, the transmission data acquiring unit 52 acquires data to be transmitted to the transmission destination device by wireless communication, from the scanner unit 12, the auxiliary storage device 8 or the like (ACT 105). The data to be transmitted is designated by an operation input on the operation panel 14 by the user. It should be noted that the processing to acquire transmission data need not be necessarily executed in this timing. The above processing up to this point may be carried out after letting the user select data to be transmitted first. Alternatively, the processing to acquire transmission data may be carried out parallel to the above processing.

Next, the communication method deciding unit 54 selects a communication method decision mode, based on the size of the data to be transmitted that is acquired by the transmission data acquiring unit 52 and the first data table 500 shown in FIG. 5 (ACT 106). For example, when the data is 400 kBytes, the communication method deciding unit 54 selects the power consumption prioritizing mode. When the data is 600 kBytes, the communication method deciding unit 54 selects the communication speed prioritizing mode.

Next, the communication method deciding unit 54 decides a wireless communication method for transmitting the data, based on the selected communication method decision mode, the wireless communication method(s) supported by the transmission destination device, and the second data table 600 shown in FIG. 6 (ACT 107). Specifically, the communication method deciding unit 54 decides a wireless communication method with top priority from among the wireless communication method(s) supported by the transmission destination device, as the wireless communication method to be used for data transmission, based on the priority corresponding to the selected communication method decision mode in the second data table 600. The wireless communication method(s) supported by the transmission destination device can be learned from the result of the search carried out by each control unit in ACT 102. For example, when the computer A 100 is the transmission destination device, the computer A 100 supports Wi-Fi 802.11n and Bluetooth. Therefore, by the search in ACT 102, the Wi-Fi 802.11n control unit 58 and the Bluetooth control unit 60 determine that wireless communication can be carried out with the computer A 100. The communication method deciding unit 54 can determine that the computer A 100 of transmission destination supports Wi-Fi 802.11n and Bluetooth.

Next, the control unit corresponding to the wireless communication method decided in ACT 107 transmits transmission data to the transmission destination device (ACT 108). For example, in the case of transmitting data of 400 kBytes to the computer A 100, Bluetooth is employed as the wireless communication method as a result of the processing up to ACT 107. Therefore, the Bluetooth control unit 60 transmits data to the computer A 100 by the Bluetooth wireless communication method via the Wi-Fi or Bluetooth antenna 20.

The flow of the wireless communication processing method in the image forming apparatus 1 of this embodiment is thus described above.

With the image forming apparatus 1 as an information processing apparatus of the above embodiment, data communication can be carried out by an optimum wireless communication method even in the case of data communication by wireless communication between devices which support plural wireless communication methods.

In the embodiment, the image forming apparatus 1 is illustrated as an information processing apparatus and the image forming apparatus 1 is described as having the function to select an optimum wireless communication method described in the embodiment. However, the apparatus used is not limited to this embodiment. The wireless communication functions described in the embodiment are applicable to various information processing apparatuses including computers such as personal computers and tablet computers, mobile terminals such as mobile phones, PDAs and portable music players, and image processing apparatuses such as copy machines, scanners, printers, MFPs, and cameras.

In the embodiment, the function to carry out wireless communication by employing an optimum wireless communication method through the above processing is described as provided in the image forming apparatus. However, the configuration of the function is not limited to this embodiment. The function can be provided in the form of a communication apparatus having a function to carry out wireless communication by selecting an optimum wireless communication method. When the function is provided in the form of the communication apparatus, this communication apparatus can be used in combination with (that is, built in or externally attached to) an information processing apparatus such as an image forming apparatus or computer. Thus, the function to carryout data communication by an optimum wireless communication method can be used in any apparatus.

Moreover, in the embodiment, Wi-Fi 802.11n, Bluetooth, and TransferJet are illustrated as wireless communication methods. However, as a matter of course, wireless communication methods used are not limited to these and other wireless communication method may also be used.

Second Embodiment

Now, a second embodiment will be described. The image forming apparatus 1 of this embodiment selects a communication method decision mode and decides a wireless communication method, based on the volume of data to be transmitted and the remaining battery capacity of a transmission destination device to which data is transmitted by wireless communication.

Figure 8:
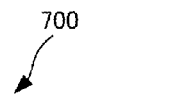
FIG. 8 shows a first data table for deciding a communication method decision mode according to an embodiment.

FIG. 8 shows a first data table 700 for deciding a wireless communication decision mode in this embodiment. In the first data table 700 of this embodiment, the remaining battery capacity of the transmission destination device is divided into three levels of large, medium, and small. The three-level division may be expressed as the rate of the remaining battery capacity. For example, a remaining capacity rate of 0 to 33% can be set as small remaining battery capacity, 34 to 66% as medium, and 67 to 100% as large.

As shown in the first data table 700, a threshold value of the communication data volume where selection switches between the power consumption prioritizing mode and the communication speed prioritizing mode changes depending on the remaining battery capacity. Specifically, as shown in the first data table 700, when the remaining battery capacity of the transmission destination device is "large", the threshold value is 100 kBytes. When the remaining battery capacity is "medium", the threshold value is 500 kBytes. When the remaining battery capacity is "small", the threshold value is 1 MBytes.

Therefore, when the remaining battery capacity is "small", which is smaller than in the other cases, power consumption is prioritized unless a larger data volume than in the case of the first embodiment (in the case of FIG. 8, 1 MBytes) is exceeded. That is, when the remaining battery capacity is small, restraining power consumption is likely to be prioritized over communication speed and a wireless communication method which requires as little consumption of the battery of the transmission destination device as possible tends to be employed.

Meanwhile, when the remaining battery capacity is "large", which is larger than in the other cases, communication speed is prioritized if a smaller data volume than in the case of the first embodiment (in the case of FIG. 8, 100 kBytes) is exceeded. That is, when the remaining battery capacity is large, a wireless communication method with a high communication speed tends to be employed.

As for the remaining battery capacity of the transmission destination, for example, when a device of data transmission destination is designated by an operation input from the user, the image forming apparatus 1 transmits a signal requesting the remaining battery capacity to the transmission destination device by one of wireless communication methods supported by the transmission destination device. Then, in response to the request signal, the transmission destination device can transmit the remaining battery capacity to the image forming apparatus 1.

Specifically, for example, when the device of data transmission destination is the computer A 100, Wi-Fi 802.11n and Bluetooth are supported and therefore one of the Wi-Fi 802.11n control unit 58 and the Bluetooth control unit 60 can, as a remaining battery capacity acquiring unit, transmits a signal requesting the remaining battery capacity to the computer via the Wi-Fi or Bluetooth antenna 20. Processing to request the remaining battery capacity may also be carried out simultaneously in the processing by the Wi-Fi 802.11n control unit 58, the Bluetooth control unit 60 and the TransferJet control unit 62 to search for a device capable of wireless communication.

The division levels of large, medium and small of the remaining battery capacity shown in the first data table 700 of FIG. 8 are only exemplary and possible division levels are not limited to this example. More or fewer division levels may be employed. Division levels of the remaining battery capacity may also be set by numeric ranges such as percentage.

The communication method deciding unit 54 selects a communication method decision mode, based on the first data table 700 described above and the data volume to be transmitted. The communication method deciding unit 54 then decides a wireless communication method, based on the second data table 600 shown in FIG. 6, the selected communication method decision mode, and the wireless communication method(s) supported by the transmission destination device. Data is then transmitted by the control unit corresponding to the decided wireless communication method. The functional blocks of this embodiment are similar to the functional blocks of FIG. 4 described in the first embodiment and therefore will not be described further in detail.

According to this embodiment described above, since a wireless communication method is set based on the remaining battery capacity of the transmission destination device, too, data communication can be carried out by a further optimum wireless communication method.

In this embodiment, the remaining battery capacity is described as the remaining battery capacity of the device of data transmission destination, but is not limited to this example. Determination can be based on the remaining battery capacity of the device on the data transmitting side (in this embodiment, the image forming apparatus 1). In such case, a data table that is the same as the first data table 700 may be used, or a data table in which the division levels of the remaining battery capacity and the threshold values of the transmission data volume are changed may be used. Deciding a wireless communication method based on the remaining battery capacity of the data transmission source is effective, for example, where the device of data transmission source is a device with a relatively small battery capacity such as the mobile terminal 300, because by doing so, battery consumption can be restrained in carrying out wireless communication.

Moreover, a wireless communication method may be decided, based on both the remaining battery capacity on the data transmitting side and the remaining battery capacity of the data transmission destination. In such case, the device on the data transmitting side and the transmission destination device may have different remaining battery capacities. In such case, when communication method decision modes are decided based on the same first data table 700, the communication method decision modes may not match.

For example, when the communication data volume is 400 kBytes, the remaining battery capacity of the image forming apparatus 1 is large, and the remaining battery capacity of the mobile terminal 300 as the transmission destination device is medium, the communication speed prioritizing mode is selected for the image forming apparatus 1 and the power consumption prioritizing mode is selected for the mobile terminal 3, and these modes do not match. In such case, for example, the communication method decision mode for the smaller remaining battery capacity can be prioritized. In the case of the above example, the communication method deciding unit 54 prioritizes the communication method decision mode that is decided based on the remaining battery capacity of the mobile terminal 300 of transmission destination, which has a smaller remaining battery capacity, and the power consumption prioritizing mode is selected as the communication method decision mode. Consequently, in this case, Bluetooth is employed as the wireless communication method.

Alternatively, in the case of deciding a wireless communication method based on the remaining battery capacity of both the data transmission source device and the transmission destination device, first data tables of different contents may be used.

Third Embodiment

Next, a third embodiment will be described. The image forming apparatus 1 of this embodiment decides a communication method decision mode, based on the data volume to be transmitted and the operation mode of the image forming apparatus 1.

FIG. 9 shows a first data table 800 for deciding a communication method decision mode in this embodiment. In the first data table 800, the operation modes of the image forming apparatus 1 are divided into normal operation and power-saving mode. The power-saving mode is an operation mode in which the apparatus operates with reduced power consumption, compared with normal operation. The power-saving mode is selected when restraining power consumption is desired. The power-saving mode, as the name of the operation mode, is only exemplary and the name of the operation mode is not limited to this. Any name may be used as long as this mode is an operation mode with lower power consumption than in normal operation.

As shown in FIG. 9, when the operation mode of the image forming apparatus 1 is the power-saving mode, a greater data volume than in the case of normal operation is set as a threshold value which separates the power consumption prioritizing mode and the communication speed prioritizing mode. Therefore, in the case of the power-saving mode, the power consumption prioritizing mode is selected even for larger data (in FIG. 9, data up to 1 MBytes). Thus, according to this embodiment, a wireless communication method suitable for the operation mode of the image forming apparatus tends to be selected and transmission and reception of data by a further optimum wireless communication method can be carried out.

As for the operation mode of the image forming apparatus 1, the communication method deciding unit 54 as an operation state acquiring unit can acquire information indicating the operation mode from a control unit which controls the operation of the image forming apparatus 1.

In the description of this embodiment, a wireless communication method is decided based on the operation mode of the image forming apparatus 1. However, the decision of a wireless communication method is not limited to this example. Information indicating the operation mode of the transmission destination device may be acquired and a wireless communication method may be decided based on the operation mode of the transmission destination device. For example, when the transmission destination device is operating in the power-saving mode, if a wireless communication method with less power consumption is selected, data communication can be carried out by a wireless communication method suitable for the operation mode of the transmission destination device.

As described above in detail, according to some embodiments, a communication apparatus which can transmit data by an optimum wireless communication method can be provided in the case of transmitting and receiving data between information processing apparatuses which support plural wireless communication methods.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A communication apparatus for an information processing apparatus, comprising:
   a data acquiring unit which acquires data to be transmitted;
   a determination unit which determines whether a volume of the data acquired by the data acquiring unit is greater than a reference value or not;
   a wireless communication method deciding unit which decides a wireless communication method by which the data is transmitted, from among plural wireless communication methods available for data transmission, and which decides a wireless communication method to be used for data transmission, based on a communication speed of each wireless communication method if the determination unit determines that the volume of the data is greater than the reference value, and decides a wireless communication method to be used for data transmission, based on power consumption at the time of wireless communication by each wireless communication method if the volume of the data is determined as equal to or smaller than the reference value;
   a wireless communication processing control unit which controls processing to transmit the data acquired by the data acquiring unit, using the wireless communication method decided by the wireless communication method deciding unit; and
   a remaining battery capacity acquiring unit which acquires at least one of the apparatus's own remaining battery capacity and a remaining battery capacity of a transmission destination device to which data is transmitted,
   wherein the wireless communication method deciding unit decides a wireless communication method to be used for data transmission according to the remaining battery capacity acquired by the remaining battery capacity acquiring unit.

2. The apparatus of claim 1, wherein the wireless communication method deciding unit decides a wireless communication method with a higher communication speed from among the plural wireless communication methods available for data transmission, as the wireless communication method to be used for data transmission, if the volume of the data is greater than the reference value.

3. The apparatus of claim 1, wherein the wireless communication method deciding unit decides a wireless communication method with smaller power consumption from among the plural wireless communication methods available for data transmission, as the wireless communication method to be used for data transmission, if the volume of the data is equal to or smaller than the reference value.

4. The apparatus of claim 1, wherein the determination unit determines the volume of the data acquired by the data acquiring unit, using a first reference value, if the remaining battery capacity acquired by the remaining battery capacity acquiring unit is smaller than a predetermined remaining battery capacity, and the determination unit determines the volume of the data acquired by the data acquiring unit, using a second reference value smaller than the first reference value, if the remaining battery capacity is larger than the predetermined remaining battery capacity.

5. The apparatus of claim 1, wherein if the remaining battery capacity acquiring unit acquires the apparatus's own remaining battery capacity and the remaining battery capacity of the transmission destination device, the wireless communication method deciding unit decides a wireless communication method to be used for data transmission, based on the remaining battery capacity with a lower rate, of the remaining battery capacities.

6. The apparatus of claim 1, wherein the wireless communication processing control unit carries out processing to search for a device with which wireless communication can be established via wireless communication by an available wireless communication method.

7. The apparatus of claim 1, further comprising an operation state acquiring unit which acquires at least one of the apparatus's own operation state and an operation state of a transmission destination device to which data is transmitted, wherein the wireless communication method deciding unit decides a wireless communication method to be used for data transmission, based on whether the operation state acquired by the operation state acquiring unit is an operation state with smaller power consumption than a normal operation state or not.

8. The apparatus of claim 1, comprising the wireless communication processing control unit for each wireless communication method available for data transmission.

9. The apparatus of claim 1, wherein the wireless communication method is at least one of an IEEE 802.11-based wireless communication method, a Bluetooth-based wireless communication method, and a TransferJet-based wireless communication method.

10. A communication method comprising:
acquiring data to be transmitted;
determining whether a volume of the acquired data is greater than a reference value or not;
deciding a wireless communication method to be used for data transmission from among plural wireless communication methods available for data transmission, based on a communication speed of each wireless communication method if the volume of the data is determined as greater than the reference value, and deciding a wireless communication method to be used for data transmission from among the plural wireless communication methods, based on power consumption at the time of wireless communication by each wireless communication method if the volume of the data is determined as equal to or smaller than the reference value; and
controlling processing to transmit the acquired data, using the decided wireless communication method,
wherein at least one of an own remaining battery capacity and a remaining battery capacity of a transmission destination device to which data is transmitted is acquired, and
a wireless communication method to be used for data transmission is decided according to the acquired remaining battery capacity.

11. The method of claim 10, wherein if the volume of the data is greater than the reference value, a wireless communication method with a higher communication speed is decided from among the plural wireless communication methods available for data transmission, as the wireless communication method to be used for data transmission.

12. The method of claim 10, wherein if the volume of the data is equal to or smaller than the reference value, a wireless communication method with smaller power consumption is decided from among the plural wireless communication methods available for data transmission, as the wireless communication method to be used for data transmission.

13. The method of claim 10, wherein if the acquired remaining battery capacity is smaller than a predetermined remaining battery capacity, the volume of the acquired data is determined using a first reference value, and if the remaining battery capacity is larger than the predetermined remaining battery capacity, the volume of the acquired data is determined using a second reference value smaller than the first reference value.

14. The method of claim 10, wherein if the own remaining battery capacity and the remaining battery capacity of the transmission destination device are acquired, a wireless communication method to be used for data transmission is decided, based on the remaining battery capacity with a lower rate, of the remaining battery capacities.

15. The method of claim 10, wherein processing to search for a device with which wireless communication can be established via wireless communication by an available wireless communication method is carried out.

16. The method of claim 10, wherein at least one of an own operation state and an operation state of a transmission destination device to which data is transmitted is acquired, and
a wireless communication method to be used for data transmission is decided, based on whether the acquired operation state is an operation state with smaller power consumption than a normal operation state or not.

17. The method of claim 10, wherein the wireless communication processing is controlled for each wireless communication method available for data transmission.

18. The method of claim 10, wherein the wireless communication method is at least one of an IEEE 802.11-based wireless communication method, a Bluetooth-based wireless communication method, and a TransferJet-based wireless communication method.

* * * * *